United States Patent

Yoshimura et al.

[11] Patent Number: 5,831,603
[45] Date of Patent: *Nov. 3, 1998

[54] COORDINATE INPUT APPARATUS

[75] Inventors: Yuichiro Yoshimura, Kamakura; Atsushi Tanaka, Kawasaki; Ryozo Yanagisawa, Inba-gun; Katsuyuki Kobayashi, Yokohama; Masaki Tokioka, Fujisawa; Hajime Sato, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 794,771

[22] Filed: Feb. 3, 1997

Related U.S. Application Data

[63] Continuation of Ser. No. 334,015, Nov. 2, 1994, abandoned.

[30] Foreign Application Priority Data

Nov. 12, 1993 [JP] Japan ..................................... 5-283106

[51] Int. Cl.[6] .................................................. G09G 5/00
[52] U.S. Cl. ........................................ 345/177; 178/18.04
[58] Field of Search .................................... 345/174, 173, 345/175, 176, 177, 179; 178/17, 19, 18, 20

[56] References Cited

U.S. PATENT DOCUMENTS

| 4,897,510 | 1/1990 | Tanaka et al. | 178/18 |
| 4,910,363 | 3/1990 | Kobayashi et al | 178/18 |
| 4,980,518 | 12/1990 | Kobayashi et al. | 178/18 |
| 5,097,102 | 3/1992 | Yoshimura et al. | 178/18 |
| 5,142,106 | 8/1992 | Yoshimura et al. | 178/18 |

FOREIGN PATENT DOCUMENTS

| 01013618 | 1/1989 | Japan . |
| 51089127 | 7/1993 | Japan . |

Primary Examiner—Regina Liang
Attorney, Agent, or Firm—Fitzpatrick, Cella, Harper & Scinto

[57] ABSTRACT

A coordinate input apparatus has an effective area in a vibration transmission member for inputting a vibration from a vibration generator and a computing unit that computes the coordinates of the position of the vibration generator on the basis of the delay time between the vibration generation and the detection of the vibrations by a vibration sensor. A vibration proof material is disposed in the periphery of the vibration transmission member to prevent the inputted vibrations from being reflected at the acoustic impedance boundary of the vibration transmission member. The vibration proof material is disposed so that the spacing between the edge of the effective area and the edge of the vibration proof material facing the effective area edge becomes larger with increasing distance along the effective area edge from the vibration sensor.

6 Claims, 11 Drawing Sheets

COORDINATE INPUT APPARATUS

This application is a continuation of application Ser. No. 08/334,015 filed Nov. 2, 1994, now abandoned.

BACKGROUND OF THE INVENTION

1. Field of the Invention

The present invention relates to coordinate input apparatus for detecting the coordinates of an input point on the basis of the transmission time of a vibration on a vibration transmitting plate or the like.

2. Description of the Related Art

Hitherto, a coordinate input apparatus has been known in which vibrations are input by a vibration pen having a piezoelectric element installed therein to a vibration transmitting plate, and the coordinates of the input point are detected by a plurality of sensors disposed on the vibration transmitting plate.

In such a coordinate input apparatus, as shown in FIG. 7, a vibration proof material is mounted in the periphery of a vibration transmitting plate 8 to prevent detection accuracy from decreasing due to interference of unwanted vibrations (reflected wave) from an end surface of the vibration transmitting plate 8.

However, a reflected wave occurs in a secondary manner even in an acoustic impedance discontinuous boundary formed in the mounting interfacial boundary of the vibration proof material itself that is mounted to prevent unwanted vibrations (reflected wave) from the end surface of the vibration transmitting plate 8. It is assumed that a rectangular region where coordinates can be input effectively within the vibration transmitting plate is an effective area. Particularly, as shown in FIG. 8, when a vibration sensor is mounted spaced a fixed distance from the vibration proof material, the effect of the reflected wave of the vibration input by a vibration pen from an area R near the side in proximity to the vibration sensor from among the four sides of the effective area and in the farthest corner from the vibration sensor is large. This large effect is caused by the boundary of the vibration proof material and occurs because the angle of reflection α shown in the figure is largest. As is well known the reflectance increases as the angle of reflection increases.

To maintain the angle of reflection α at a predetermined angle or less, it is necessary to increase the distance between the effective area and the boundary of the vibration proof material and to enlarge the vibration transmitting plate. That is, in the construction in which a conventional vibration sensor is mounted spaced a predetermined distance from the vibration proof material, the effective area, the vibration proof material, the vibration sensor, and the vibration transmitting plate are disposed and their dimensions are determined so that the angle of reflection becomes a predetermined angle or less on the basis of the place where the influence of the reflected wave from the effective area becomes a maximum. As a result, apparatus is enlarged, which is problematical. Conversely, in the construction of the prior art, when an attempt is made to make the apparatus compact, the angle of reflection in the acoustic impedance boundary becomes large and the reflectance becomes large, causing the coordinate detection accuracy to decrease due to the influence by the reflected wave.

SUMMARY OF THE INVENTION

The present invention has been achieved in view of the above-described prior art. It is an object of present invention to provide a coordinate input apparatus which is capable of detecting coordinates with a high degree of accuracy and which is small in size.

It is another object of present invention to provide a coordinate input apparatus in which the angle of reflection of the vibration reflected by the acoustic impedance boundary and reaching the vibration sensor becomes small, and the reflected vibration becomes small.

It is still another object of present invention to provide a coordinate input apparatus capable of decreasing the reflected wave by gradually decreasing acoustic impedance.

To achieve the above-described object, according to one aspect of the present invention, there is provided a coordinate input apparatus including: a vibration generator; a vibration transmitting member for inputting vibrations generated by the vibration generator and transmitting them; a sensor for detecting vibrations of the vibration transmitting member; a computing unit for computing the coordinates of the input position on the vibration transmitting member on the basis of vibrations detected by the detection sensor; and a vibration proof material, disposed in the periphery of the vibration transmitting member, for preventing the vibrations from being reflected in the boundary of acoustic impedance, wherein the vibration proof material is disposed so that the spacing between the effective area and the edge of the vibration proof material facing the effective area becomes larger as the distance along the edge of the effective area from the detection sensor increases.

The above and further objects, aspects and novel features of the invention will more fully appear from the following detailed description when read in connection with the accompanying drawings. It is to be expressly understood, however, that the drawings are for the purpose of illustration only and are not intended to limit the invention.

DETAILED DESCRIPTION OF THE PREFERRED EMBODIMENTS

The present invention will be explained below with reference to the accompanying drawings.

Figure 1:
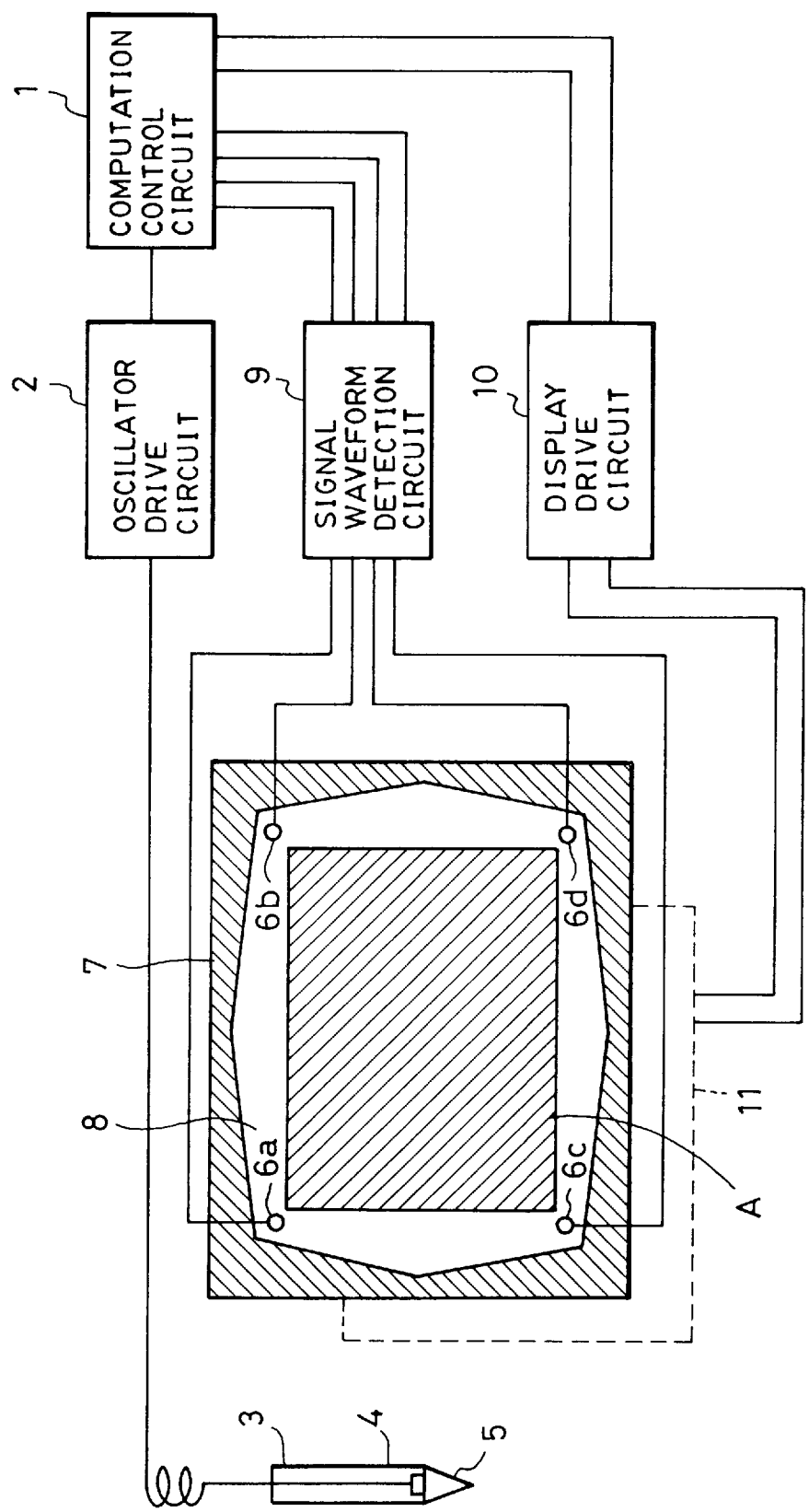
FIG. 1 is a block diagram of a coordinate input apparatus.

Referring to FIG. 1, reference numeral 1 denotes a computation control circuit for centrally controlling the apparatus and computing a coordinate position; reference numeral 2 denotes an oscillator drive circuit which causes the pen point 5 of a vibration pen 3 to vibrate; and reference numeral 8 denotes a vibration transmitting plate 8 made from a transparent member, such as acrylic or a glass plate. Inputting of coordinates by the vibration pen 3 is performed by touching the vibration transmitting plate 8. In practice, the area of the reference character A (hereinafter referred to as the effective area) indicated by the solid line in the figure is pointed by the vibration pen 3. A vibration proof material 7 is provided in the outer periphery of the vibration transmitting plate 8 for preventing (decreasing) reflected vibrations from returning to the central portion. The vibration proof material 7, as shown in the figure, is mounted obliquely so as to become larger with the distance between the boundary of the vibration proof material and the boundary of the effective area where the above-described inputting of coordinates is made effective from the vibration proof material 7. A series of actions regarding the shape of the vibration proof material will be described later in detail. Vibration sensors 6a to 6d, such as piezoelectric elements, for converting mechanical vibrations into electrical signals are fixed in the peripheral portion of the vibration proof material or the vibration transmitting plate 8. Further, signals of a signal waveform detection circuit 9 corresponding to each of the vibration sensors 6a to 6d are input to the computation control circuit 1. Reference numeral 11 denotes a display device, such as a liquid-crystal display device, which is capable of displaying in units of dot, which is disposed in the rear of the vibration transmitting plate. The display device makes it possible to display dots at positions traced by the vibration pen 3 as a result of the driving of a display drive circuit 10 and to view the dots through the vibration transmitting plate 8 (made from a transparent member).

The oscillator 4 contained in the vibration pen 3 is driven by the oscillator drive circuit 2. The drive signal of the oscillator 4 is supplied as a low-level pulse signal from the computation control circuit 1, amplified at a predetermined gain by the oscillator drive circuit 2, after which the signal is applied to the oscillator 4.

The electrical drive signal is converted into mechanical ultrasonic wave vibrations by the oscillator 4 and transmitted to the vibration transmitting plate 8 via the pen point 5.

Figure 2:
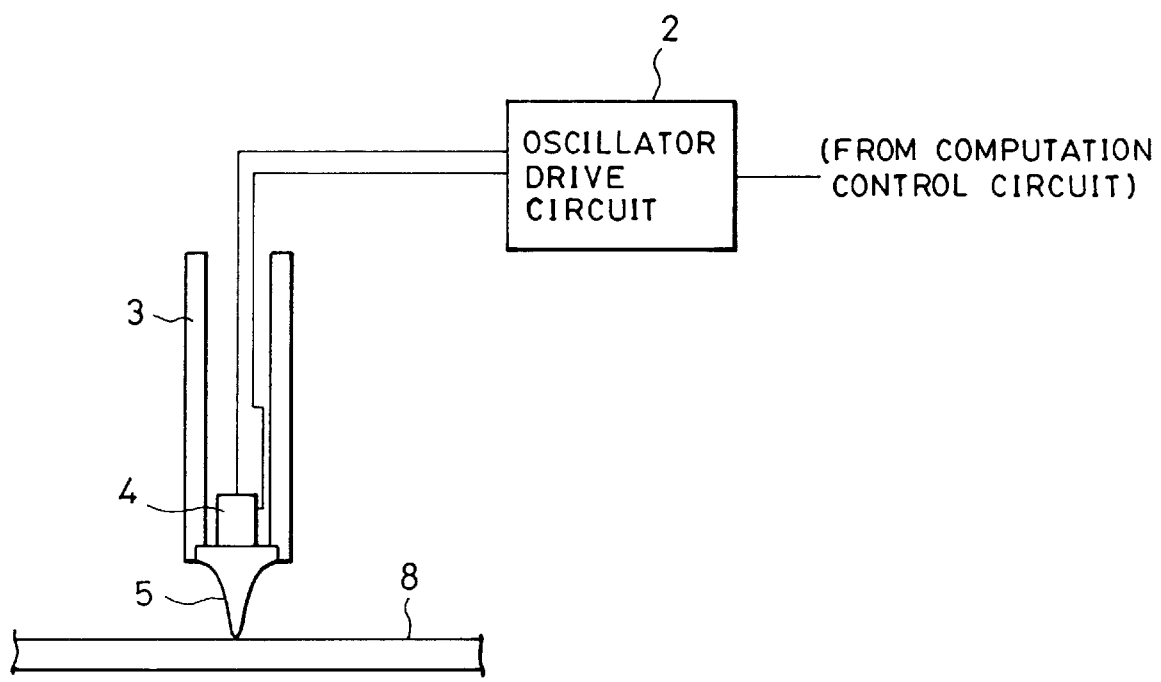
FIG. 2 is a view illustrating the construction of a vibration pen.

The drive frequency of the oscillator 4 is selected to be a value such that a Lamb wave can be generated on the vibration transmitting plate 8 of glass or the like. When driving the oscillator, a mode is selected which vibrates the vibration transmitting plate 8 perpendicularly in FIG. 2. When the vibration frequency of the oscillator 4 is set at the resonance frequency, including the pen point 5, highly efficient vibration conversion is possible.

The elastic wave transmitted to the vibration transmitting plate 8 in the above-described way is a Lamb wave, and has the advantage that the surface of the vibration transmitting plate is not easily damaged or susceptible to an obstacle or the like in comparison with the surface wave or the like.

<Explanation of computation control circuit>

In the above-described construction, the computation control circuit 1 makes the oscillator drive circuit 2 output a signal for driving the oscillator 4 within the vibration pen 3 at predetermined cycles (for example, 5 ms), and makes the internal timer thereof (formed of a counter) start to count time. The vibration generated by the vibration pen 3 reaching the vibration sensors 6a to 6d is delayed by an amount corresponding to the distance to the vibration sensors 6a to 6d.

The signal waveform detection circuit 9 detects signals from each of the vibration sensors 6a to 6d and generates a signal indicating a time at which the vibration reaches each vibration sensor by waveform detection processing which will be described later. The computation control circuit 1 receives the signal from each sensor in order to detect the time when the vibration reaches each of the vibration sensors 6a to 6d and computes the coordinate position of the input by the vibration pen 3.

The computation control circuit 1 drives the display drive circuit 10 on the basis of the computed positional information of the vibration pen 3 in order to control the display by the display 11 or to output the coordinates to an external apparatus by serial or parallel communication (not shown).

Figure 3:
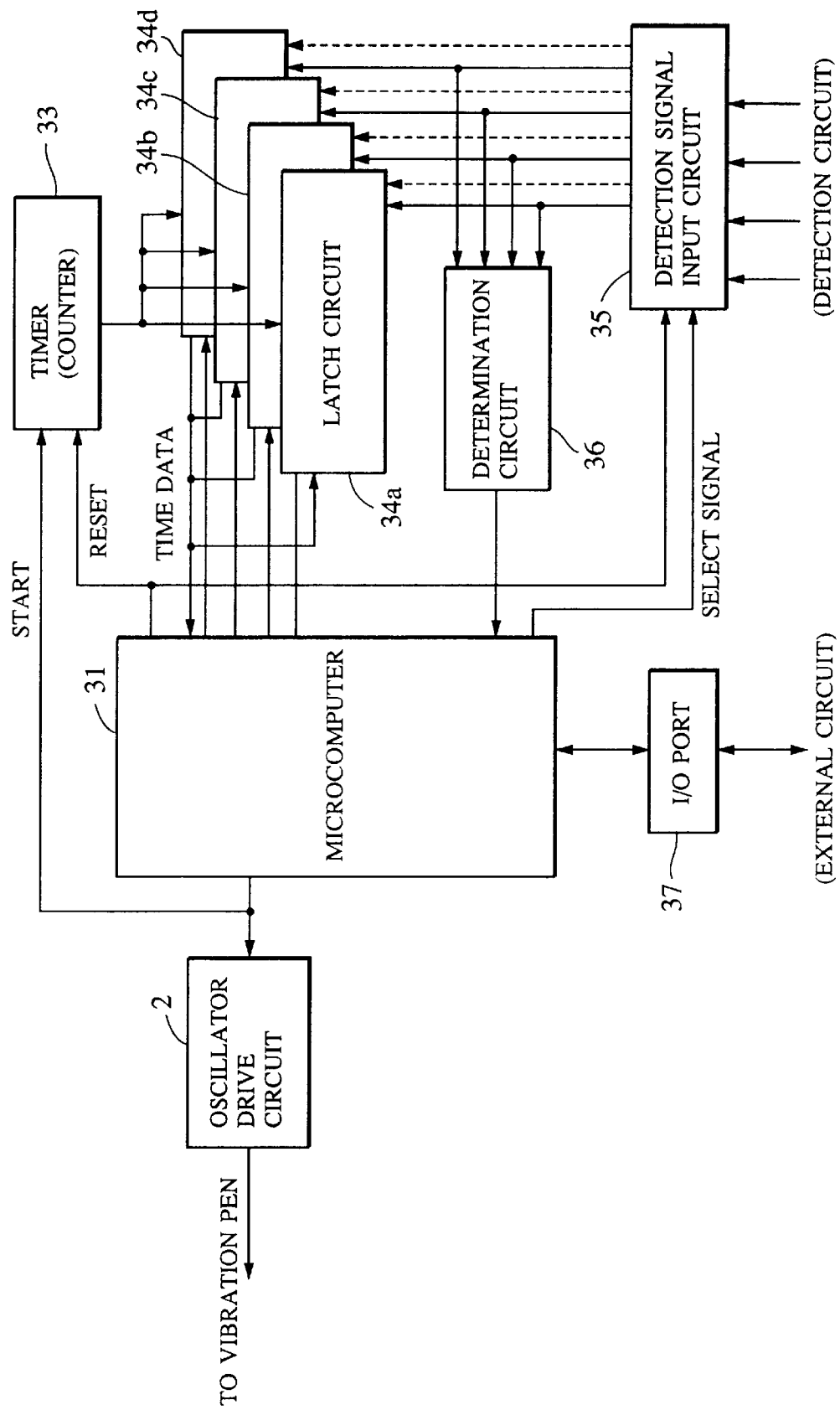
FIG. 3 is a block diagram illustrating a computation control circuit in one embodiment of the present invention.

FIG. 3 is a block diagram schematically illustrating the construction of the computation control circuit 1 in accordance with the embodiment of the present invention. Each component and the operation thereof will be explained below.

Referring to FIG. 3, reference numeral 31 denotes a microcomputer for controlling the computation control circuit 1 and the entire coordinate input apparatus, which microcomputer comprises an internal counter, a ROM in which operation procedures are stored, a RAM used for calculation and the like, and a non-volatile memory for storing constants.

Reference numeral 33 denotes a timer for counting a reference clock (not shown), which timer is formed of a counter or the like. When a start signal for starting the oscillator 4 in the vibration pen 3 is input into the oscillator drive circuit 2, the timer starts counting time. As a result, the starting of the time counting is synchronized with the vibration detected by the sensor, and it becomes possible to measure the delay time until the vibration is detected by the sensors 6a to 6d.

The other components of circuits will be explained step by step.

The timing signals from each of the vibration sensors 6a to 6d, which are output from the signal waveform detection circuit 9, are input to latch circuits 34a to 34d via a detection signal input port 35.

The latch circuits 34a to 34d correspond to the vibration sensors 6a to 6d, respectively. When the latch circuits 34a to 34d receive timing signals from their corresponding sensors, they latch the time counted value of the timer 33 at that time. When it is determined by a determination circuit 36 that all the detection signals have been received, a signal indicating this fact is output to the microcomputer 31.

When the microcomputer 31 receives the signal from the determination circuit 36, the microcomputer 31 reads the time that the vibration reaches each vibration sensor from the latch circuits 34a to 34d, and performs predetermined calculations to calculate the coordinate position of the vibration pen 3 on the vibration transmitting plate 8.

By outputting calculated coordinate positional information to the display drive circuit 10 via an I/O port 37, it is possible to display dots at a corresponding position of the display device 11. Or, by outputting coordinate positional information to an interface circuit via the I/O port 37, it is possible to output the coordinate values to an external apparatus.

<Explanation of vibration propagation time detection (FIGS. 4 and 5)>

An explanation will be given below of the principle by which the time that a vibration reaches the vibration sensor 6 is measured.

Figure 4:
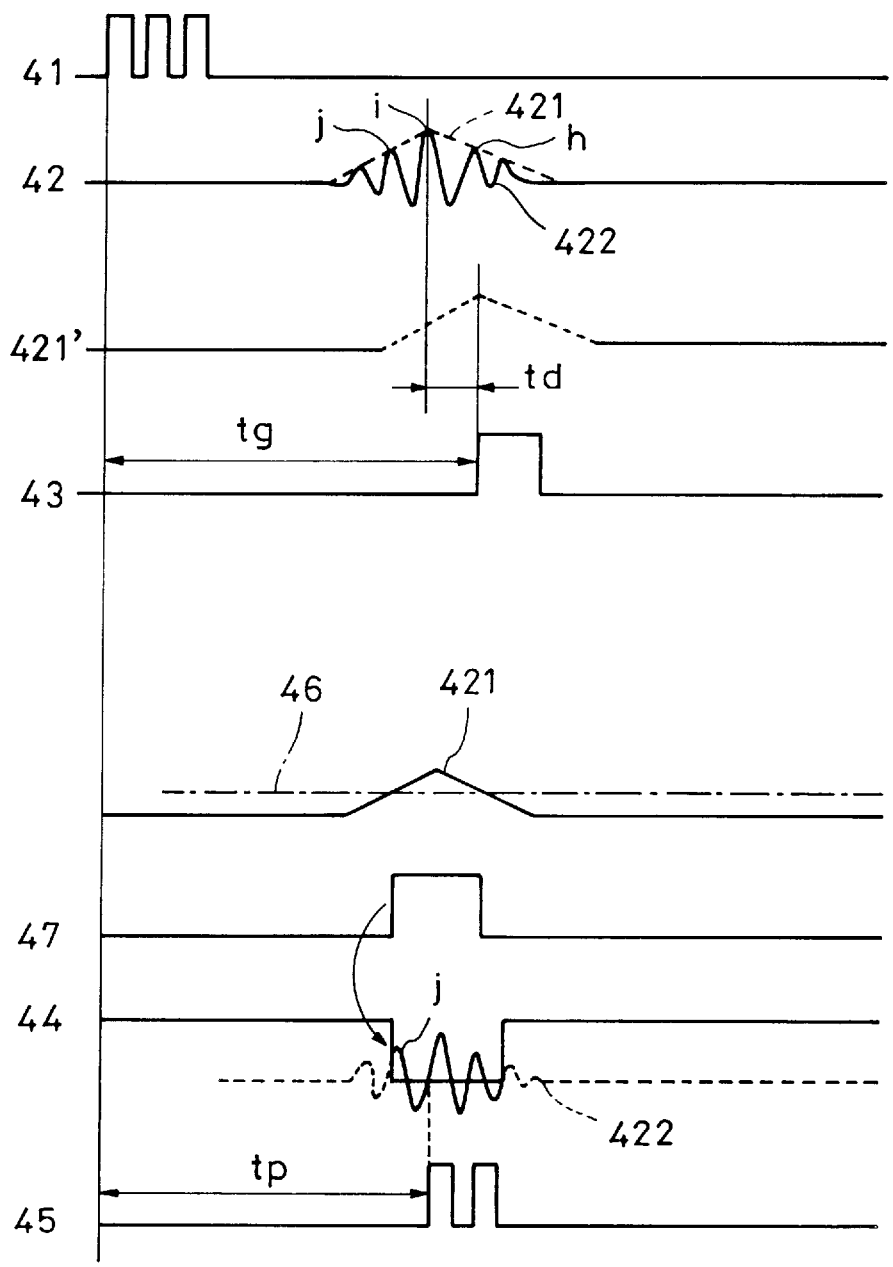
FIG. 4 is a timing chart of signal processing.

FIG. 4 is a timing chart illustrating the detected waveform which is input to the signal waveform detection circuit 9, and also illustrating the operation for measuring the time the vibration is transmitted on the basis of the waveform. Although the vibration sensor 6a will now be explained, the explanation applies to the other vibration sensors 6b to 6d.

It has already been explained that the measurement of the time it takes for the vibration to reach the vibration sensor 6 is started at the same time when a start signal is output to the oscillator drive circuit 2. At this time, a drive signal 41 has been applied to the oscillator 4 from the oscillator drive circuit 2. This drive signal 41 indicates that the ultrasonic vibration transmitted to the vibration transmitting plate 8 from the vibration pen 3 is a signal waveform which traveled for a time tg corresponding to the distance to the vibration sensor 6a.

Since the vibration used in this embodiment is a Lamb wave, the relationship between an envelope 421 of the detected waveform with respect to the distance of propagation within the vibration transmitting plate 8 and a phase 422 varies in proportion to the transmission distance. The velocity at which the envelope 421 travels, i.e., a group velocity, is denoted as Vg, and the phase speed of the phase 422 is denoted as Vp. On the basis of the group velocity Vg and the phase speed Vp, it is possible to detect the distance between the vibration pen 3 and the vibration sensor 6a.

First, only the envelope 421 will be considered. Its speed is Vg, and when a point on a specific waveform, for example, a deflection point or a peak as a signal indicated by reference numeral 43, is detected, the distance between the vibration pen 3 and the vibration sensor 6a is given as follows when the vibration time thereof is denoted as tg:

$$d = Vg \cdot tg \tag{1}$$

This equation is related to one vibration sensor 6a, and the distance between the other three vibration sensors 6b to 6d and the vibration pen 3 can also be expressed by the same equation.

Further, to determine coordinates more accurately, processing based on phase signal detection is performed.

The time from the specific point at which the phase 422 is detected, for example, the point of vibration application, to the zero-cross point after a predetermined signal level 46 is reached, is denoted as tp (obtainable by generating a window signal 44 with respect to a signal 47 and differentiating it from the phase signal 422), the distance between the vibration sensor and the vibration pen becomes as described below:

$$d = n \cdot \lambda p + Vp \cdot tp \tag{2}$$

where $\lambda p$ is the wavelength of the elastic wave, and n is an integer.

On the basis of equations (1) and (2) above, the integer n can be expressed as follows:

$$n = [(Vg \cdot tg - Vp \cdot tp)/\lambda p + 1/N] \tag{3}$$

where N is a real number other than "0" and an appropriate value is used. For example, if N is set at 2 and if N is a variation of tg or the like within $\pm\frac{1}{2}$, n can be determined. The substitution of n determined as described above in equation (2) makes it possible to measure the distance between the vibration pen 3 and the vibration sensor 6a with a high degree of accuracy. The signals 43 and 45 for measuring the above-described two vibration transmitted times tg and tp are generated by the signal waveform detection circuit 9 which is constructed as shown in FIG. 5.

Figure 5:
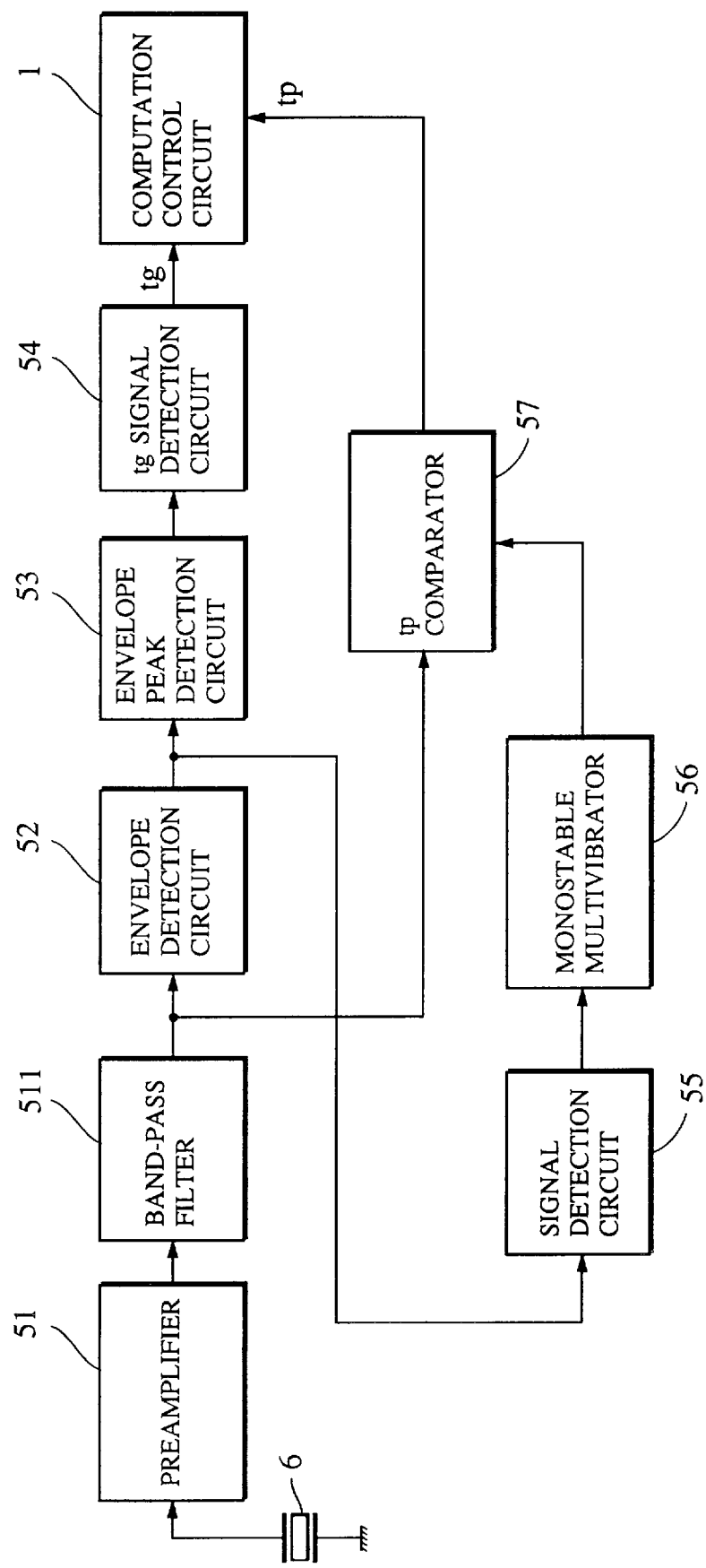
FIG. 5 is a block diagram of a direction detection circuit.

FIG. 5 is a block diagram illustrating the construction of the signal waveform detection circuit 9 in accordance with this embodiment.

In FIG. 5, the signal output from the vibration sensor 6a is amplified to a predetermined level by a preamplifier circuit 51. The extra frequency components of the amplified, detected signal are removed by a band-pass filter 511 and input to an envelope detection circuit 52 formed of an absolute value circuit, a low-pass filter and the like where only the envelope of the detected signal is taken out. The timing of the envelope crest is detected by an envelope peak detection circuit 53. In the peak detection circuit, the signal 43 (see FIG. 4), which is a predetermined waveform envelope delay time detected signal, is generated by a tg signal detection circuit 54 formed of a monostable multivibrator and the like, and the signal is input to the computation control circuit 1.

Reference numeral 55 denotes a signal detection circuit which forms a pulse signal 47 for that portion of the envelope signal 421 detected by the envelope detection circuit 52, in which a threshold signal 46 at a predetermined level is exceeded. Reference numeral 56 denotes a monostable multivibrator which opens a gate signal 44 of a predetermined time width, which is triggered at the first leading edge of the signal 47. Reference numeral 57 denotes a tp comparator which detects the zero-cross point of the first leading edge of the phase signal 422 during the period in which the gate signal 44 is opened and supplies the phase delay time signal 45 to the computation control circuit 1. The circuits described above are for the vibration sensor 6a, and the same circuits are disposed for the other vibration sensors.

<Explanation of circuit delay time correction>

The vibration transmission time latched by the above-described latch circuit includes a circuit delay time et and a phase offset time toff. The deviation caused by these times always is of the same amount when a vibration is transmitted from the vibration pen 3 to the vibration transmitting plate 8 and to the vibration sensors 6a to 6d.

Figure 6:
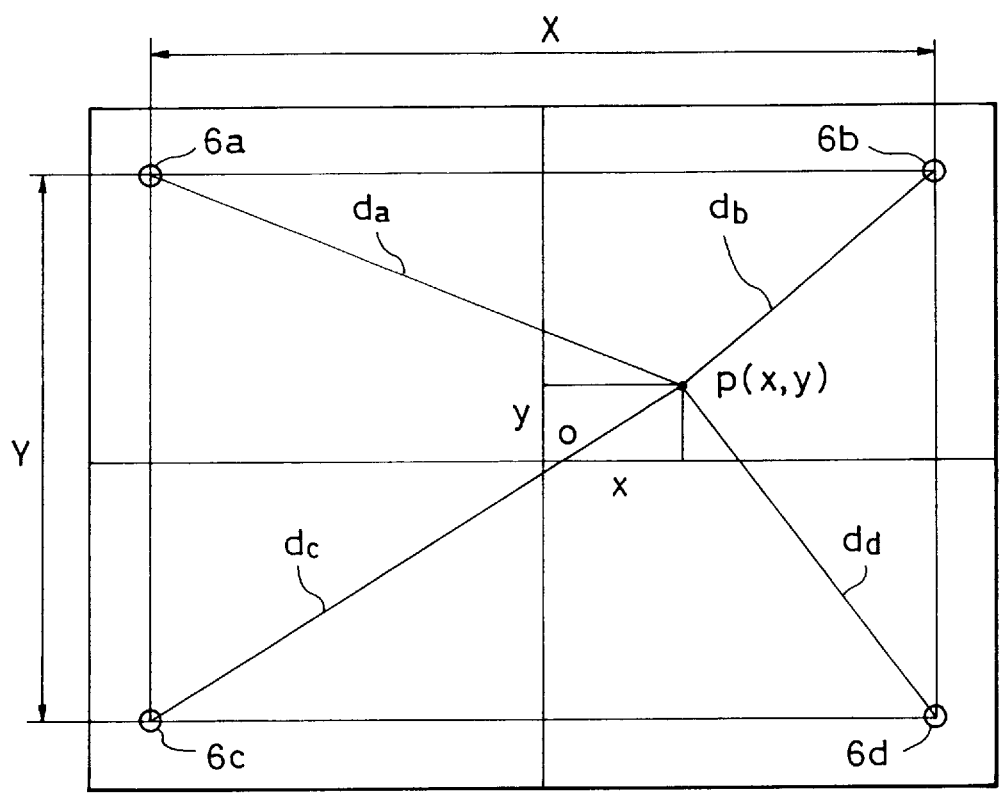
FIG. 6 is a view illustrating the coordinate system of the coordinate input apparatus.
Figure 7:
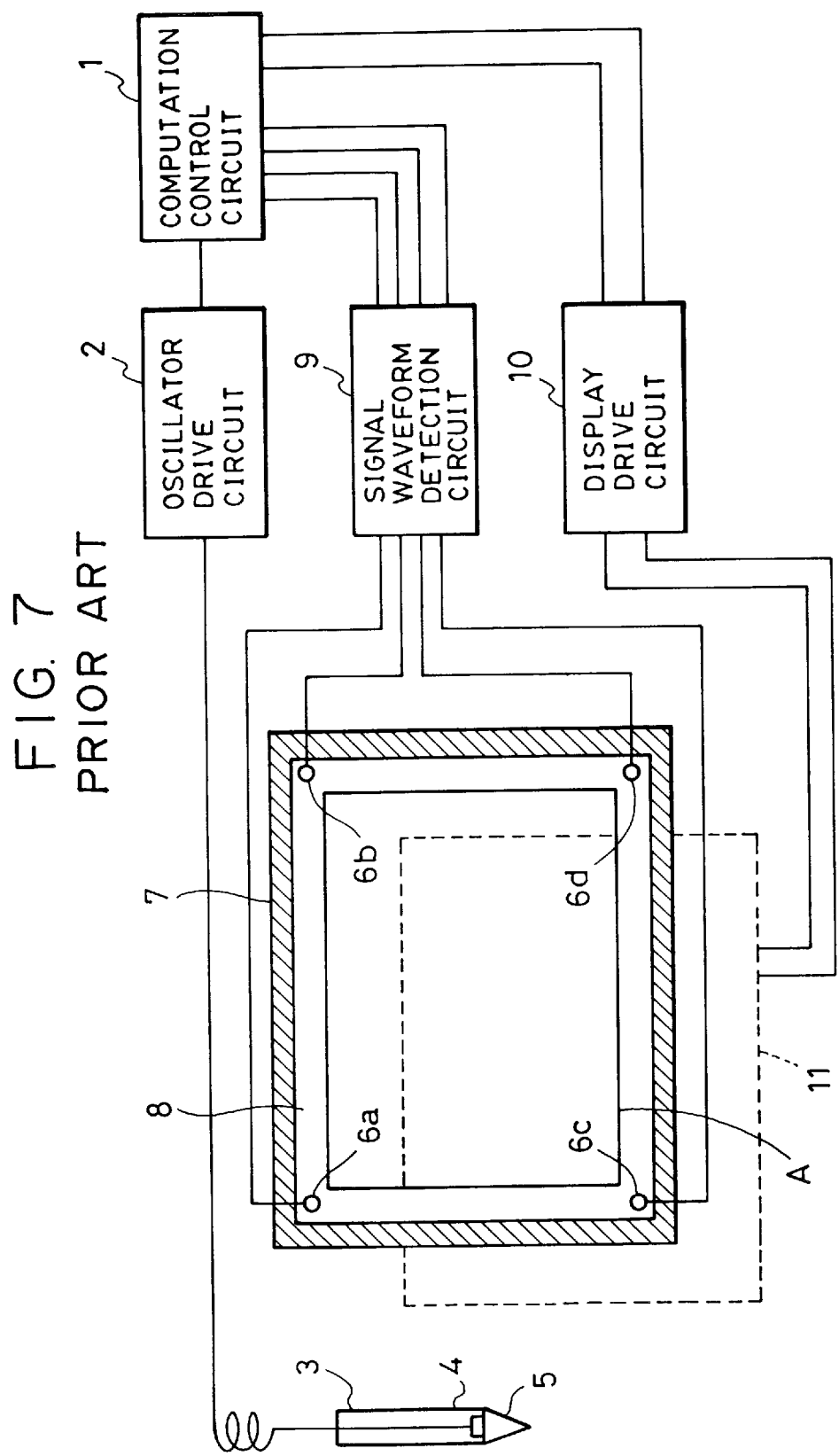
FIG. 7 is a view illustrating the construction of a conventional vibration proof material.

The distance from the origin O of FIG. 6 to the vibration sensor 6a is denoted as R1. When an input is made at origin O by the vibration pen 3 and the measured vibration transmitted times from origin O to the vibration sensor 6 are denoted as tgz' and tpz', and true transmission times from origin O to the sensors are denoted as tgz and tpz, the following relation is satisfied between the circuit delay time et and the phase offset time toff:

$$tgz' = tgz + et \tag{4}$$

$$tpz' = tpz + et + toff \tag{5}$$

On the other hand, the measured values tg' and tp' at an arbitrary input point P are similarly:

$$tg' = tg + et \tag{6}$$

$$tp' = tp + et + toff \tag{7}$$

The difference between equations (4) and (6), and that between equations (5) and (7) can be determined as follows:

$$tg' - tgz' = (tg + et) - (tgz + et) = tg - tgz \tag{8}$$

$$tp'-tpz'=tg'+et+toff-(tpz+et+toff)=tp-tpz \quad (9)$$

Thus, the circuit delay time et and the phase offset time toff contained in each transmission time are removed, and it is possible to determine the difference between true transmission delay times corresponding to the distance which starts from the position of the vibration sensor 6a as an origin between one end of origin O to the input point P. Thus, the distance difference can be determined by using equations (2) and (3) above.

Since the distance from the vibration sensor 6a to the origin O is prestored in a non-volatile memory or the like and is known, it is possible to determine the distance between the vibration pen 3 and the vibration sensor 6a. The distance between the vibration pen 3 and the other vibration sensors 6b to 6d can be determined in the same manner.

The measured values tgz' and tpz' at origin O are stored in a non-volatile memory before shipment. Equations (8) and (9) are performed before equations (2) and (3), and thus a measurement with a high degree of accuracy can be performed.

<Explanation of calculation of coordinate position (FIG. 6)>

Next, the principle of detecting the coordinate position on the vibration transmitting plate 8 by the vibration pen 3 will be explained.

It is assumed that four vibration sensors 6a to 6d are disposed at positions indicated by reference numerals S1 to S4, respectively, in the vicinity of the middle point of the four sides on the vibration transmitting plate 8. Based on the previously explained principle, the straight-line distances da to dd from the position P of the vibration pen 3 to each of the vibration sensors 6a to 6d can be determined. Further, on the basis of the straight-line distances da to dd, the coordinates (x,y) of position P of the vibration pen 3 can be determined by the computation control circuit 1 on the basis of the Pythagorean theorem as described below:

$$x=(da+db)\cdot(da-db)/2X \quad (10)$$

$$y=(dc+dc)\cdot(dd-dd)/2Y \quad (11)$$

where X and Y are respectively the distance between the vibration sensors 6a and 6b, and the distance between the vibration sensors 6c and 6d.

In the above-described way, the positional coordinates of the vibration pen 3 can be detected in real time.

<Construction of vibration proof material and vibration transmitting plate>

Figure 8:
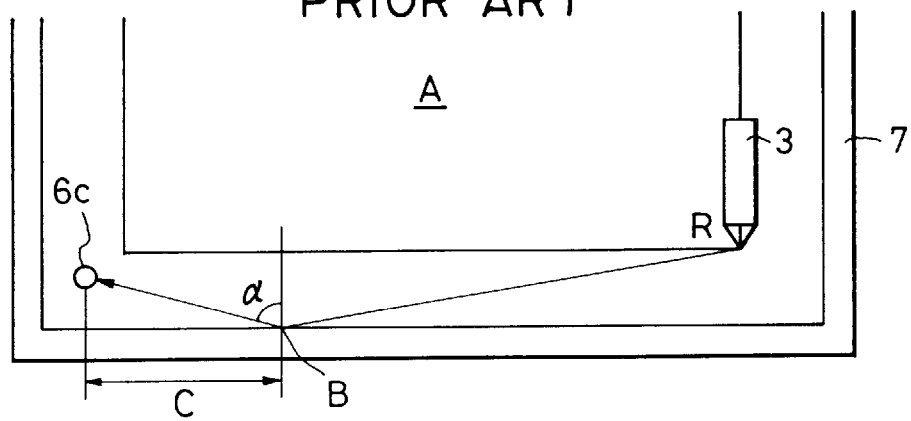
FIG. 8 is a view illustrating the construction of the conventional vibration proof material.
Figure 9:
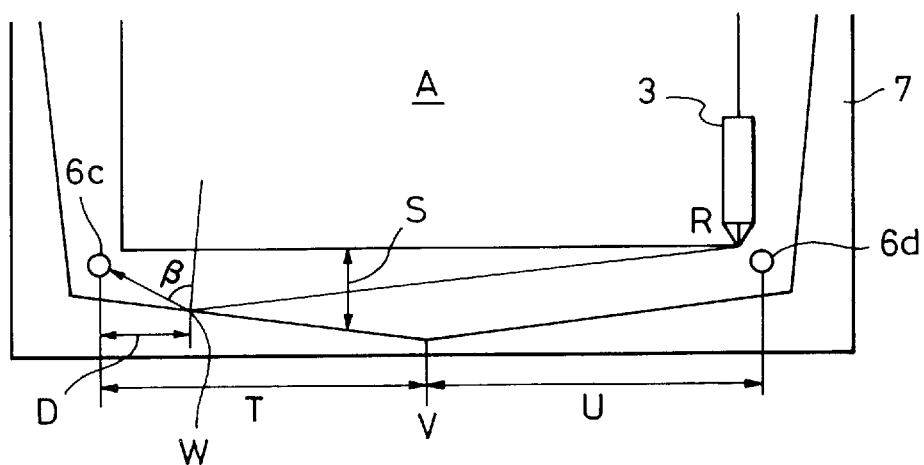
FIG. 9 is a view illustrating the construction of a vibration proof material in accordance with a first embodiment of the present invention.

An explanation will now be given of the construction of the vibration proof material and the vibration transmitting plate in the apparatus of this embodiment. The construction of the vibration proof material shown in FIG. 1 will be described in comparison with the prior art by using FIG. 9 which shows the passage in which the reflected wave is transmitted. As shown in FIG. 9, the vibration proof material 7 is obliquely mounted so as to become larger with the distance S between the side of the effective area A and the boundary of the vibration proof material near the side from the vibration sensor in the vicinity of the boundary of the vibration proof material. A vibration sensor 6c shown in FIG. 9 will be used as an example. The wave reflected from the boundary of the vibration proof material having the largest influence upon the vibration sensor 6c is a reflected wave such that a vibration which is input from a region R on a side in the vicinity of the vibration sensor 6c from among the four sides of the effective area A and in the farthest corner from the vibration sensor 6c is reflected on the boundary of the vibration proof material. This is attributed to the fact that the angle of reflection at this time is greatest, and the reflectance increases as the angle of reflection increases as described above. The angle of reflection in this construction is denoted as β. When the angle of reflection β is compared with the angle of reflection α, both angles of which are shown in FIG. 8, in a conventional case where the distance between the boundary of the vibration proof material and the side of the effective area A is constant, it is clear that α>β is satisfied geometrically. Therefore, the reflectance decreases as compared with the prior art, and it is possible to reduce the influence by the reflected wave upon the direct wave from the vibration pen to be detected. That is, the vibration is reflected on the boundary in which the acoustic impedance varies. However, in this embodiment, a vibration proof material is provided in the boundary so that the angle of reflection decreases.

Figure 10:
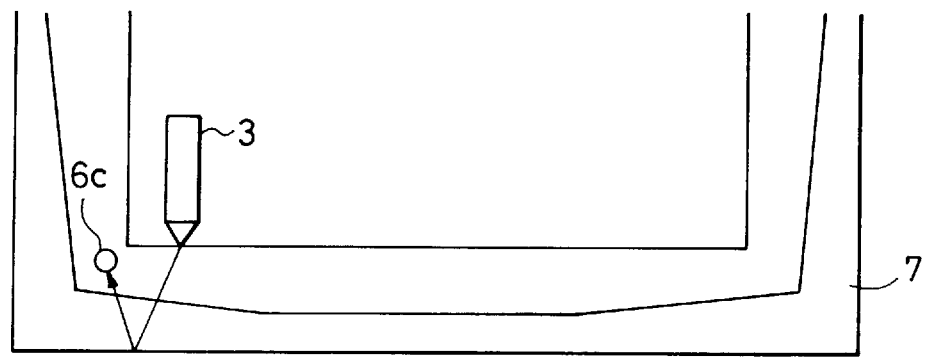
FIG. 10 is a view illustrating another construction of the vibration proof material in accordance with the first embodiment of the present invention.

In this embodiment, since the vibration proof material having the above-described shape is mounted on the vibration transmitting plate in a square shape (regular square, rectangular), the width of the vibration proof material in the vicinity of the vibration sensor increases. Because of this, as shown in FIG. 10, the transmission path in the vibration proof material, in which the reflected wave is transmitted from the end surface of the vibration transmitting plate, increases, thereby making it possible to effectively attenuate the wave reflected from the end surface of the vibration transmitting plate. Since the vibration proof material is used to each vibration sensor in the vicinity of the corner of the vibration transmitting plate, which vibration proof material is mounted obliquely to the vibration transmission plate periphery so as to become nearer thereto with the distance S between the boundary of the vibration proof material and the boundary of the effective area where the input of coordinates is effective from the vibration sensor. The oblique shape of the vibration proof material is a limited area where an area T of the vibration sensor 6c comes into contact with an area U of the vibration sensor 6d at a position V, as shown in FIG. 9. The problematical area when the angle of reflection increases is the area from the area R in the farthest corner to a reflection point W of the reflected wave which reaches the vibration sensor 6c regarding, for example, the vibration sensor 6c. However, since this point is contained in the area T, it is possible to realize the effect of the decrease in the angle of reflection without a problem.

Further, since the distance D from the vibration sensor to the reflection portion W in FIG. 9 is shorter than the distance C from the vibration sensor to the reflection portion B in the conventional construction of FIG. 8, the width of the vibration proof material in the central portion of the side may be increased as in FIG. 10.

With the above-described construction of the coordinate input apparatus of this embodiment, the angle of reflection of a vibration can be reduced even if the vibration sensor is in relative proximity to the vibration proof material. It is therefore possible to suppress the reflected vibration and make it small. Therefore, it is possible to make the apparatus compact, and its accuracy is not decreased by the influence of the reflected components of the vibration.

In a second embodiment of the present invention, a coordinate input apparatus which is constructed in the same way as in the first embodiment except for the vibration proof material. The explanation of the construction and functions which are the same as those of the first embodiment is omitted.

<Construction using saw-tooth vibration proof material>

Figure 11:
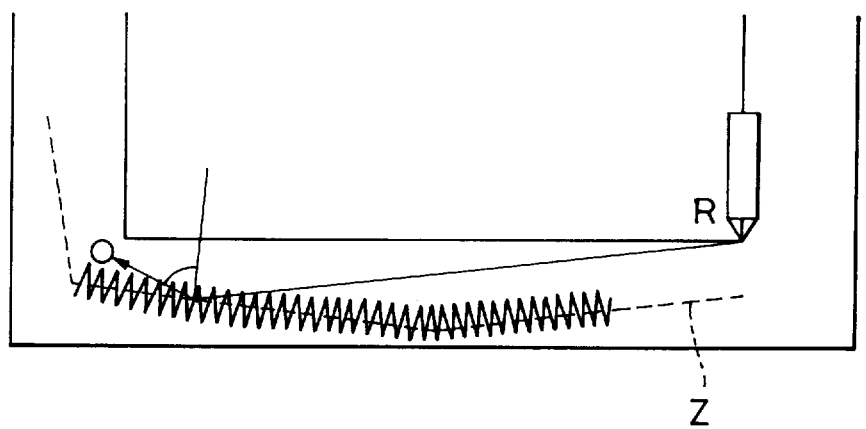
FIG. 11 is a view illustrating the construction of a vibration proof material in accordance with a second embodiment of the present invention.

Although the first embodiment describes a case in which the boundary of the vibration proof material is in a straight line, as shown in FIG. 11, the boundary of the vibration proof material may be formed with a vibration proof material in a saw-tooth shape in which crests and roots are joined continuously. Such a shape of the vibration proof material where the boundary of which is formed in a saw-tooth shape in which crests and bottoms are joined continuously, has been proposed from the past. The vibration proof material has the excellent characteristic that a wave reflected from the boundary of the vibration proof material can be reduced more than a case in which the vibration proof material is in a straight line.

This characteristic is not caused by the generation of a reflected wave in the shape of the very small, individual crests and bottoms, but is caused by a mild variation of the impedance in the boundary of the vibration proof material. This is due to the fact that the vibration proof material has a depth between the crests and roots greater than the wavelength of the vibration at a repeat cycle of crests and roots, which wavelength is equal to or greater than the wavelength of the vibration which is transmitted on the vibration transmitting plate. Thus, as shown in FIG. 11, the vibration from the area R on the side in the vicinity of the vibration sensor from among the four sides of the effective area A and in the corner farthest from the vibration sensor is not reflected by the individual very small crests and roots, but reflected by the linear interfacial boundary indicated by the dotted line Z in the figure as a reflecting surface. The reflecting surface indicated by the dotted line may be considered as a seeming reflecting surface (boundary) with respect to the wave reflected by the clear acoustic impedance noncontinuous surface.

Accordingly, as shown in FIG. 11, since the vibration proof material 7 is mounted so as to become larger with the distance between the apparent reflecting surface Z of the vibration proof material formed in a saw-tooth shape and the side of the effective area A from the vibration sensor disposed in the vicinity of the end portion of the side, it is possible to reduce the influence by the reflected wave which is input from the area R farthest from the vibration sensor on the side in the vicinity of the vibration sensor from among the four sides of the effective area A and which is reflected by the apparent boundary, which wave is a reflected wave from the boundary of the vibration proof material having the greatest influence upon the vibration sensor.

<Case in which the boundary of the vibration proof material is a curve>

Figure 12:
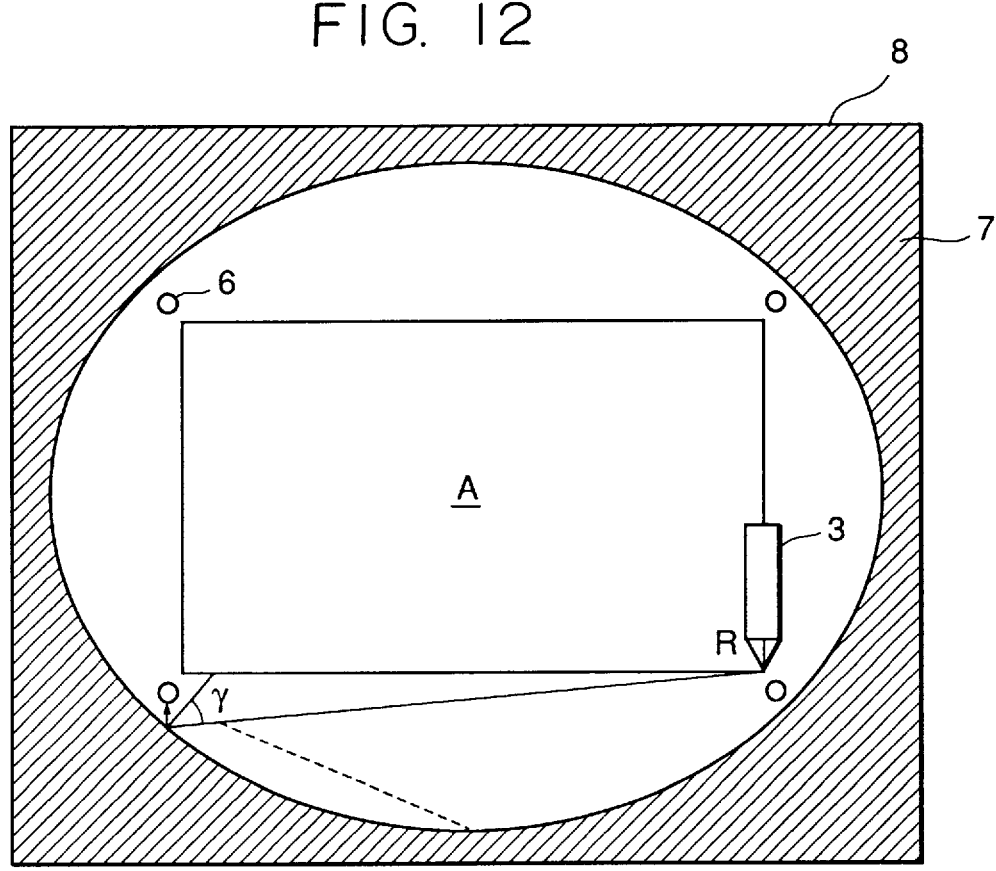
FIG. 12 is a view illustrating the construction of another vibration proof material in accordance with the second embodiment of the present invention.

Although in the foregoing an embodiment in which the boundary of the vibration proof material is linear, including the case of an apparent shape, is described, the boundary may be formed into a curve. Another embodiment of the present invention is shown in FIG. 12 in which the boundary of the vibration proof material is a convex curve which outwardly protrudes from the effective area toward the periphery so that the vibration proof material becomes larger with the distance between the boundary of the vibration proof material and the side of the effective area A from the vibration sensor. In this case, it is possible to decrease the angle of reflection γ geometrically from the boundary of the vibration proof material having the greatest influence upon the vibration sensor 6 more than a case in which the boundary of the vibration proof material is formed in a straight line indicated by the dotted line in the figure with regard to the angle of reflection γ of the reflected wave reflected. As a result, the reflected wave, that is, the vibration which is input from the area R in the corner on the side in the vicinity of the corresponding vibration sensor from among the four sides of the effective area A and farthest from the vibration sensor, reaches the corresponding vibration sensor. Accordingly, it is possible to effectively decrease the reflection of the reflected wave generated in the boundary of the vibration proof material.

<Shape combinations of vibration transmitting plate>

Figure 13:
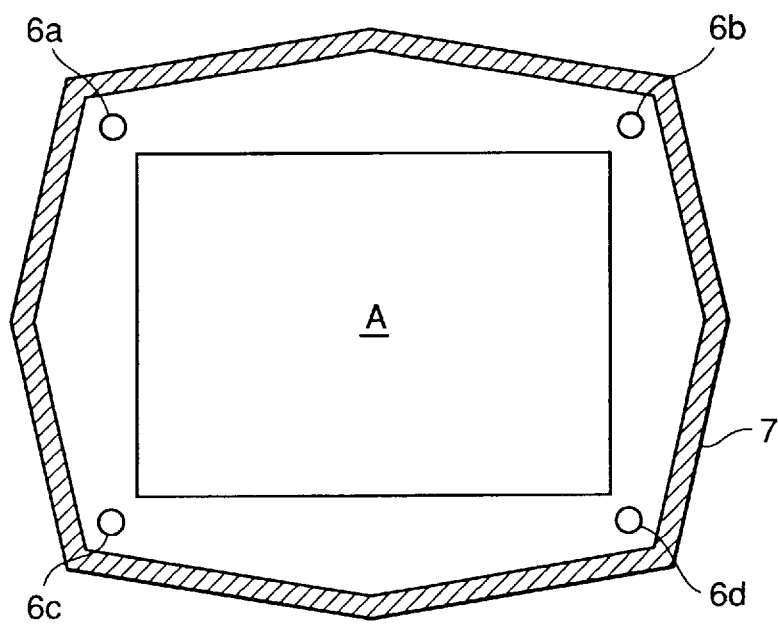
FIG. 13 is a view illustrating the vibration proof material and a vibration transmitting plate in accordance with the second embodiment of the present invention.

In the foregoing, an embodiment regarding the shape of the vibration proof material is described. However, the shape of the vibration transmitting plate may be varied according to the shape of the vibration proof material. In FIG. 13, the vibration proof material 7 is obliquely mounted so as to become larger with the distance between the boundary of the vibration proof material and the boundary of the effective area A from the vibration sensor, and the vibration transmitting plate is obliquely cut in agreement with the shape of the vibration proof material, and the width of the vibration proof material is constant.

Figure 14:
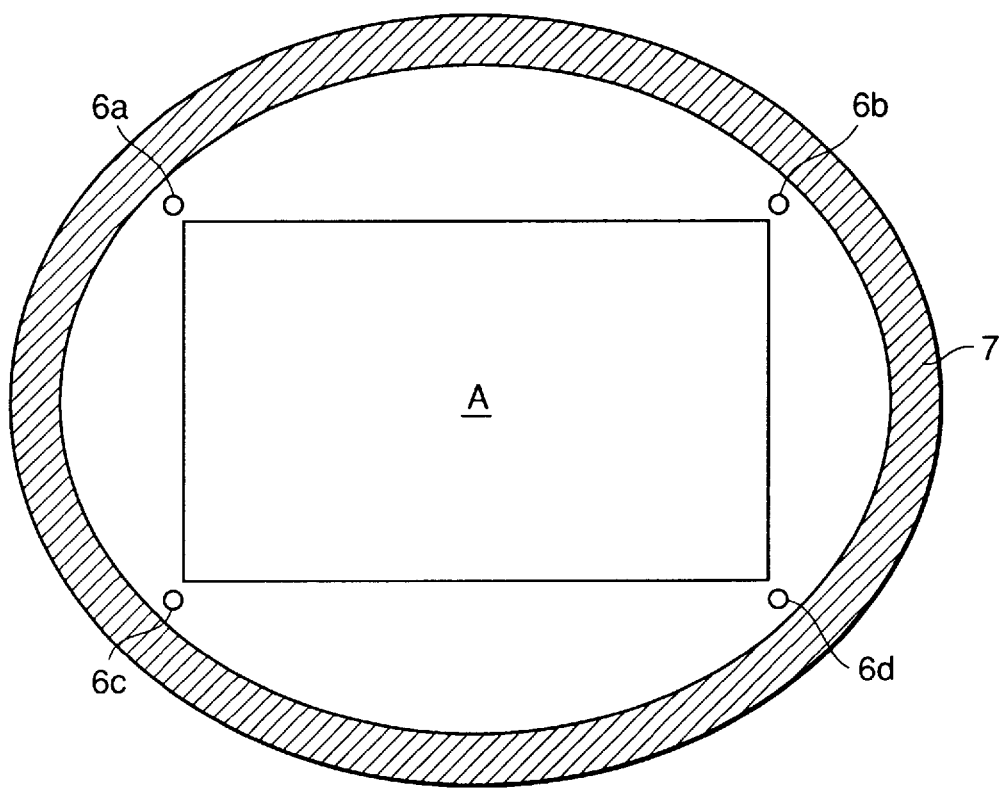
FIG. 14 is a view illustrating another vibration proof material and the vibration transmitting plate in accordance with the second embodiment of the present invention.

FIG. 14 shows the shape of the vibration transmitting plate in a case in which the boundary of the vibration proof material is formed as a curve. As a result, it becomes possible to make the vibration transmitting plate compact, and the degree of freedom increases in the assembly into another apparatus, making it possible to make the apparatus compact as a whole.

As described above, the coordinate input apparatus of the first to third embodiments (1) input vibrations from a vibration source to a vibration transmitting plate, (2) make a vibration sensor disposed spaced by a fixed distance from the vibration proof material at a plurality of places, disposed in the vicinity of the corners of the vibration transmitting plate, (3) detect the Lamb wave vibration which is transmitted in the vibration transmitting plate having a vibration proof material for absorbing vibration provided in the periphery of the vibration transmitting plate, and (4) count the time it takes for the vibration to reach from the vibration source to the vibration detecting means in order to detect the coordinates of the vibration source. In such a coordinate input apparatus, the vibration proof material and the vibration transmitting plate are formed so that the distance between the boundary of the acoustic impedance variation and the boundary of the effective area where an input of coordinates is effective becomes larger, which distance is related to the wavelength of the vibration transmitted in the vibration transmitting plate, from the the vibration sensor. Accordingly, the angle of reflection of the reflected wave decreases. As a result, it is possible to reduce the angle of reflection of the reflected wave of the vibration in the boundary of the vibration proof material, which is input from the area R on the side in the vicinity of the vibration sensor from among the four sides of the effective area A and farthest from the vibration sensor. Accordingly, it is possible to decrease the reflectance of the vibration, and to reduce the influence of the reflected wave which affects the detection of the coordinates. Thus, the accuracy of coordinate detection can be improved, and when the same accuracy as in the prior art is maintained, it is possible to make the vibration transmitting plate compact, thus making the apparatus compact.

It is also possible to form the vibration transmitting plate to a shape such that the corner is cut or to a curve shape other than a conventional square (regular square, rectangular), and possible to increase the degree of freedom in terms of space when the vibration transmitting plate is assembled with another display unit or external apparatus.

In the foregoing, the embodiments of the present invention are described regarding the shape of the vibration proof material and the vibration transmitting plate. However, in addition to the above-described construction and shape, the construction may be such that the vibration proof material is mounted so as to extend further toward the effective area with decreasing distance from the vibration sensor. The angle of reflection of the reflected wave which reaches the vibration sensor decreases and the vibration transmitting plate is formed according to the shape of the vibration proof material. Also, the construction may be based on the position at which the vibration sensor is mounted.

The present invention may be applied to a system formed of a plurality of apparatuses or to an apparatus formed of one unit. Needless to say, the present invention can be applied to a case in which programs are supplied to a system or apparatus.

The present invention has been achieved in view of the above-described conventional examples. The present invention has the advantage that it is possible to detect coordinates with a high degree of accuracy and to make the apparatus compact.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications, equivalent structures and functions.

What is claimed is:

1. A coordinate input apparatus, comprising:

vibration generating means;

a vibration transmitting member including an effective area for inputting vibrations generated by the vibration generating means and for transmitting the inputted vibrations;

a plurality of vibration sensors for detecting the vibrations of the vibration transmitting member;

computing means for computing coordinates of an input position on said vibration transmitting member on the basis of the vibrations detected by the plurality of sensors; and a vibration proof material, disposed in the periphery of said vibration transmitting member, for preventing the vibrations of the vibration transmitting member from being reflected at a boundary of the vibration proof material disposed for preventing a reflected wave which is generated at an edge of the vibration transmitting member, wherein the vibration proof material is disposed so that a spacing between an edge of the effective area and the edge of the vibration proof material facing the effective area edge becomes larger as a distance along the edge of the effective area from said vibration sensors increases.

2. A coordinate input apparatus according to claim 1, wherein the boundary for preventing a reflected wave is formed by forming said vibration proof material into a saw-tooth shape such that its crests and roots are combined continuously.

3. A coordinate input apparatus according to claim 2, wherein the depth between said crests and roots is greater than the wavelength of the vibrations generated by said vibration generating means.

4. A coordinate input apparatus according to claim 1, wherein the edge of the vibration proof material facing the effective area edge is a straight edge oblique to the effective area edge.

5. A coordinate input apparatus according to claim 1, wherein the edge of the vibration proof material facing the effective area edge is an oval shaped edge.

6. A coordinate input apparatus, comprising:

a vibration transmitting member including an effective area for inputting vibrations and for transmitting the inputted vibrations;

a plurality of sensors for detecting the vibrations of the vibration transmitting member;

computing means for computing coordinates of an input position on said vibration transmitting member on the basis of the vibrations detected by the plurality of sensors; and a vibration proof material, disposed in the periphery of said vibration transmitting member, for preventing the vibrations of the vibration transmission member from being reflected at the boundary of acoustic impedance of the vibration transmission member, wherein the vibration proof material is disposed so that a spacing between an edge of the effective area and an edge of the vibration proof material facing the effective area edge becomes larger as a distance along the edge of the effective area from said vibration sensors increases.

* * * * *